(12) United States Patent
Slay, Jr. et al.

(10) Patent No.: US 9,467,825 B2
(45) Date of Patent: Oct. 11, 2016

(54) ALERTS BASED ON VEHICLE AND DEVICE TELEMATICS

(71) Applicant: Verizon Patent and Licensing Inc., Arlington, VA (US)

(72) Inventors: Harold Rex Slay, Jr., Valrico, FL (US); Jivko Varlakov, Homosassa, FL (US); Carl T. White, Odessa, FL (US); Robert Kneusel, Lithia, FL (US); Jagannath K. Rangarajan, Irving, TX (US); Nityanand Sharma, Tampa, FL (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 3 days.

(21) Appl. No.: 14/314,901

(22) Filed: Jun. 25, 2014

(65) Prior Publication Data

US 2015/0382160 A1    Dec. 31, 2015

(51) Int. Cl.
| | | |
|---|---|---|
| *H04W 4/00* | (2009.01) |
| *H04W 4/12* | (2009.01) |
| *H04W 4/04* | (2009.01) |
| *H04W 4/02* | (2009.01) |
| *H04W 4/14* | (2009.01) |

(52) U.S. Cl.
CPC .............. *H04W 4/12* (2013.01); *H04W 4/028* (2013.01); *H04W 4/046* (2013.01); *H04W 4/14* (2013.01)

(58) Field of Classification Search
CPC ....... H04W 4/12; H04W 4/14; H04W 4/028; H04W 4/046
USPC ......................................................... 455/466
See application file for complete search history.

(56) References Cited

U.S. PATENT DOCUMENTS

| | | | | |
|---|---|---|---|---|
| 6,662,023 | B1* | 12/2003 | Helle ........................... 455/558 |
| 9,104,537 | B1* | 8/2015 | Penilla .................... G06F 17/00 |
| 2002/0115436 | A1* | 8/2002 | Howell ................. B60R 25/102 455/426.1 |
| 2006/0276162 | A1* | 12/2006 | Flick ..................... B60R 25/102 455/344 |
| 2008/0167806 | A1* | 7/2008 | Wheeler ............... G01S 5/0027 701/532 |
| 2008/0275604 | A1* | 11/2008 | Perry .................. B60R 25/2018 701/31.5 |
| 2009/0119014 | A1* | 5/2009 | Caplan ................... G01C 21/26 701/469 |
| 2009/0322558 | A1* | 12/2009 | Videtich ............... H04W 4/206 340/870.07 |
| 2011/0084807 | A1* | 4/2011 | Logan ..................... H04Q 9/00 340/10.1 |
| 2013/0012123 | A1* | 1/2013 | DeLuca ................. A45C 13/18 455/39 |
| 2013/0038432 | A1* | 2/2013 | Grost et al. ................ 340/425.5 |
| 2013/0293384 | A1* | 11/2013 | Reyes .................... H04W 48/04 340/669 |
| 2013/0344856 | A1* | 12/2013 | Silver ............... H04M 1/72577 455/418 |
| 2014/0243749 | A1* | 8/2014 | Edwards et al. ............. 604/187 |
| 2015/0179033 | A1* | 6/2015 | Birk et al. ................. 340/572.1 |

* cited by examiner

*Primary Examiner* — Charles Shedrick

(57) ABSTRACT

A computer device may include logic configured to obtain vehicle telematics data relating to a vehicle operated by a user and to obtain device telematics data relating to a user device operated by the user. The logic may be further configured to determine that a distance between the user device and the vehicle is greater than a first distance threshold, based on the obtained vehicle telematics data and based on the obtained device telematics data; and send an alert to a mobile communication device associated with the user, in response to determining that the distance between the user device and the vehicle is greater than the first distance threshold.

20 Claims, 12 Drawing Sheets

ALERTS BASED ON VEHICLE AND DEVICE TELEMATICS

BACKGROUND INFORMATION

A user may visit a location to perform a service, such as repairing equipment, configuring a device for a customer, or troubleshooting a device or service at the location. The user may visit a large number of locations during the course of a day. The user may carry and use a user device to enable the user to perform various functions relating to the required service, such as interfacing with another device at the location, using the user device to troubleshoot a problem, or communicating with a central office to exchange information. The user may inadvertently leave the user device at a location and may have to spend time to figure out where the user device was left and then return to the location to retrieve the user device.

DETAILED DESCRIPTION OF PREFERRED EMBODIMENTS

Figure 1:
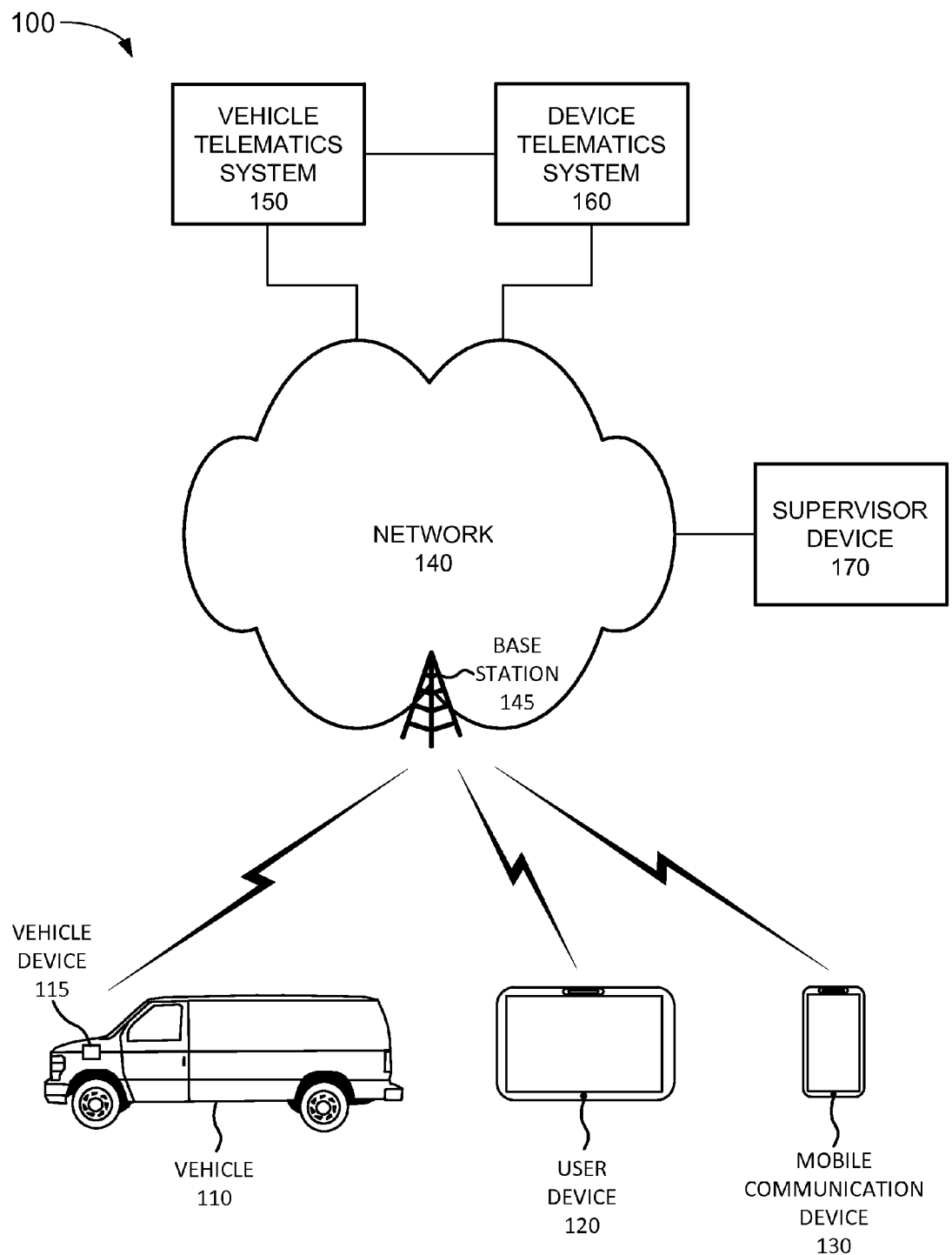
FIG. 1 is a diagram illustrating an environment according to an implementation described herein.

The following detailed description refers to the accompanying drawings. The same reference numbers in different drawings identify the same or similar elements.

A user may use a user device while servicing a particular location, such as a customer's home, a business location, and/or another type of location. In some implementations, the user device may correspond to a technician device, such as a tablet computer device; a computerized diagnostics device; a computerized tool, testing device, and/or measuring device; and/or another type of technician device. In other implementations, the user device may correspond to a different type of device. The user may forget the user device at the location, which may lead to the user device being lost, resulting in financial losses and secure data being compromised. The user also may use a vehicle to drive from location to location. Implementations described herein relate to alerts based on vehicle and device telematics. A device telematics system may obtain vehicle telematics data from the vehicle, which may include the location of the vehicle, and may obtain device telematics data, which may include the location of the user device. The device telematics system may determine a distance between the vehicle and the user device. If the determined distance is greater than a first distance threshold (e.g., one mile, etc.), the device telematics system may send an alert to a mobile communication device associated with the user (e.g., the user's personal mobile phone).

The alert may include, for example, a Short Messaging Service (SMS) message, a Multimedia Messaging Service (MMS) message, an email message, and/or another type of message. The alert may inform the user that the user device has been left at a particular location and may include information identifying the last known location. Furthermore, the device telematics system may, in addition to sending the alert to the user's mobile communication device, send an instruction to the user device to lock the user device and/or may send an instruction to the user device to display a message to call the number of the user's mobile communication device.

Furthermore, the device telematics system may determine that, at a later time, the distance between the vehicle and the user device is greater than a second threshold (e.g., three miles, etc.) as the user continues to drive away from the location where the user device has been left. In response, the device telematics system may send an alert to the user's supervisor.

In some situations, the vehicle and/or the user device may not be reachable. For example, the vehicle and/or user device may be outside of wireless coverage and the device telematics system may not be able to obtain the telematics data. If the device telematics system determines that the vehicle is not reachable for at least a particular time period (e.g., 60 minutes, etc.), and if the vehicle has been assigned to a user and is not scheduled for maintenance, the device telematics system may send an alert to the supervisor. If the device telematics system determines that the user device is not reachable for at least a particular time period (e.g., 15 minutes, etc.), the device telematics system may send an alert to the user's mobile communication device. If the user device is not reachable for a longer time period (e.g., 60 minutes, etc.), the device telematics system may send an alert to the supervisor.

Furthermore, in some implementations, an alert application may be provided to the user to install on the user's mobile communication device. The alert application may obtain a wireless identifier (e.g., a Bluetooth identifier) for the user device and a wireless identifier for the vehicle. The alert application may, at particular intervals, attempt to detect the obtained wireless identifiers. In some implementations, the alert application may detect the vehicle identifier and may determine that the user device identifier is not detectable during the same time period. After a particular length of time, the alert application may determine that the user device is not within range while the vehicle is within range and may, in response, generate an alert for the user. In other implementations, the alert application may determine that the user device identifier is not detectable and that the mobile communication device is moving faster than a threshold (e.g., corresponding to a driving speed) and may, in response, generate an alert for the user.

FIG. 1 is a diagram illustrating exemplary components of an environment 100 according to an implementation described herein. As shown in FIG. 1, environment 100 may include a vehicle 110, a user device 120, a mobile communication device 130, a network 140, a vehicle telematics system 150, a device telematics system 160, and a supervisor device 170.

Vehicle 110 may be used by a user to drive to service locations. Vehicle 110 may include vehicle device 115. Vehicle device 115 may collect telematics data about vehicle 110 and may wirelessly transmit the telematics data to vehicle telematics system 150 via network 140. The vehicle telematics data may include, for example, a vehicle identification number (VIN), the geographic coordinates of vehicle 110 (e.g., latitude and longitude), the accuracy of the geographic coordinates, a time stamp, a speed of vehicle 110, a direction in which vehicle 110 is headed, the average speed of vehicle 110 during a particular time period, and/or other types of telematics data.

User device 120 may be used by a user to perform a service, such as configuring or troubleshooting a piece of equipment at a customer location. In some implementations, user device 120 may correspond to a technician device, such as a tablet computer device; a computerized diagnostics device; a computerized tool, testing device, and/or measuring device; and/or another type of technician device. In other implementations, user device 120 may correspond to a different type of device. For example, user device 120 may correspond to any device configured to provide location data to a telematics system at particular intervals over a wireless connection.

User device 120 may include a portable communication device such as a tablet computer, a laptop computer, a mobile phone, a smart phone, a phablet computer device, a wearable computer device (e.g., a glasses smartphone device, a wristwatch smartphone device, etc.), and/or any other type of mobile computer device with wireless communication and output capabilities. User device 120 may collect device telematics data and may wirelessly transmit the telematics data to device telematics system 160 via network 140. User device 120 may include a user interface, such as touch screen, that may function as an input device and as an output device.

Mobile communication device 130 may correspond to a device associated with the user, such as the user's personal mobile phone. Mobile communication device 130 may include a portable communication device such as a tablet computer, a laptop computer, a mobile phone, a smart phone, a phablet computer device, a wearable computer device (e.g., a glasses smartphone device, a wristwatch smartphone device, etc.), and/or any other type of mobile computer device with wireless communication and output capabilities. Mobile communication device 130 may receive an alert from device telematics system 160 and may output the alert. In some implementations, mobile communication device 130 may include an alert application that may generate an alert based on not being able to detect a wireless identifier associated with user device 120.

Network 140 may include one or more circuit-switched networks and/or packet-switched networks. For example, network 140 may include a local area network (LAN), a wide area network (WAN), a metropolitan area network (MAN), a Public Switched Telephone Network (PSTN), an ad hoc network, an intranet, the Internet, a fiber optic-based network, a wireless network, a satellite network, and/or a combination of these or other types of networks. Network 140 may include base station 145. Base station 145 may function as a base station that enables vehicle device 115, user device 120, and/or mobile communication device 130 to wirelessly communicate with network 140. For example, base station 145 may include a Long Term Evolution eNodeB base station, a Global System for Mobile Communications (GSM) base station, a Code Division Multiple Access (CDMA) base station, and/or another type of base station.

Vehicle telematics system 150 may include one or more devices, such as computer devices and/or server devices, which are configured to receive vehicle telematics data about vehicle 110 from vehicle device 115. Vehicle telematics system 150 may provide the received vehicle telematics data to device telematics system 160.

Device telematics system 160 may receive vehicle telematics data, relating to vehicle 110, from vehicle telematics system 150 and may receive device telematics data from user device 120. The device telematics data may include, for example, a software version associated with user device 120, a time stamp, time zone data, the geographic coordinates of user device 120 (e.g., latitude and longitude), the accuracy of the geographic coordinates, a mobile equipment identifier (MEID) and/or an International Mobile Station Equipment Identity (IMEI) identifier, a wireless signal strength, a battery condition, an equipment serial number, an Internet Protocol (IP) address, a total available memory, a processor load, whether Global Positioning System (GPS) functionality is enabled, a list of installed applications, an operating system (OS) version, a total device uptime, a total traffic in bytes since uptime, whether user device 120 is enabled for Long Term Evolution (LTE) functionality, and/or other types of data. In some implementations, the device telematics data may be also include particular data stored on technician device 120, which may be used as backup data in case technician device 120 is lost or damaged.

Device telematics system 160 may determine whether, based on the obtained vehicle telematics data and the obtained device telematics data, the distance between vehicle 110 and user device 120 is greater than a first threshold distance and may send an alert to mobile communication device 130. If the distance between vehicle 110 and user device 120 is greater than a second threshold distance, larger than the first threshold distance, device telematics system 160 may send an alert to supervisor device 170. Supervisor device 170 may be associated with a supervisor of the user associated with user device 120. For example, supervisor device 170 may correspond to the supervisor's computer device, such as a desktop computer, laptop computer, tablet computer, mobile phone, smart phone, and/or another type of computer device.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
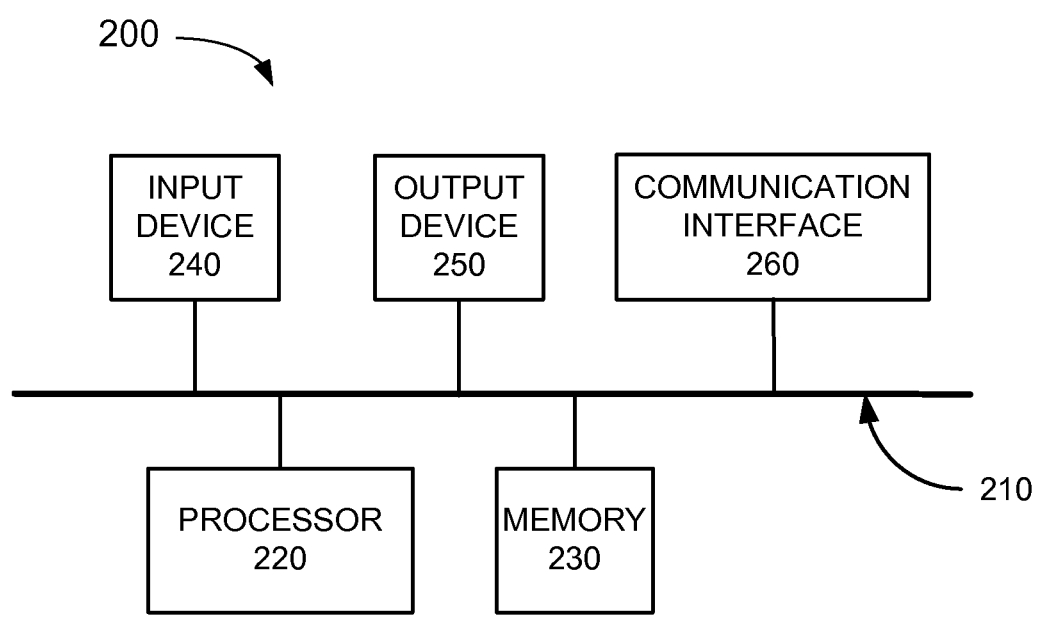
FIG. 2 is a diagram illustrating exemplary components of the device telematics system of FIG. 1.

FIG. 2 is a diagram illustrating exemplary functional components of device 200 according to an implementation described herein. Vehicle telematics system 150, device telematics system 160, and/or supervisor device 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to generating alerts based on vehicle telematics data and device telematics data. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
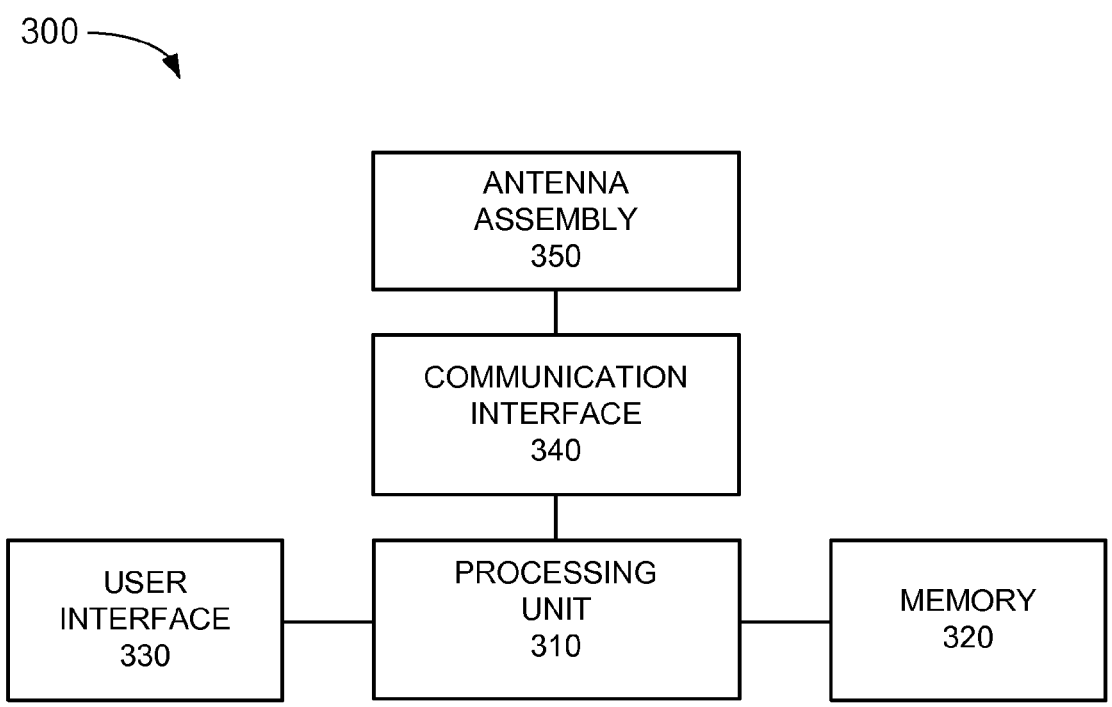
FIG. 3 is a diagram illustrating exemplary components of a mobile device that may be included in the vehicle device, user device, or mobile communication device of FIG. 1.

FIG. 3 is a diagram illustrating exemplary components of device 300 according to an implementation described herein. Vehicle device 115, user device 120, and/or mobile communication device 130 may each include one or more devices 300. As shown in FIG. 3, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of mobile device 130 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to device 300 and/or to output information from device 300. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 300 to vibrate; a sensor; and/or any other type of input or output device.

Communication interface 340 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. Additionally or alternatively, one or more components of device 300 may perform the tasks described as being performed by one or more other components of device 300.

Figure 4:
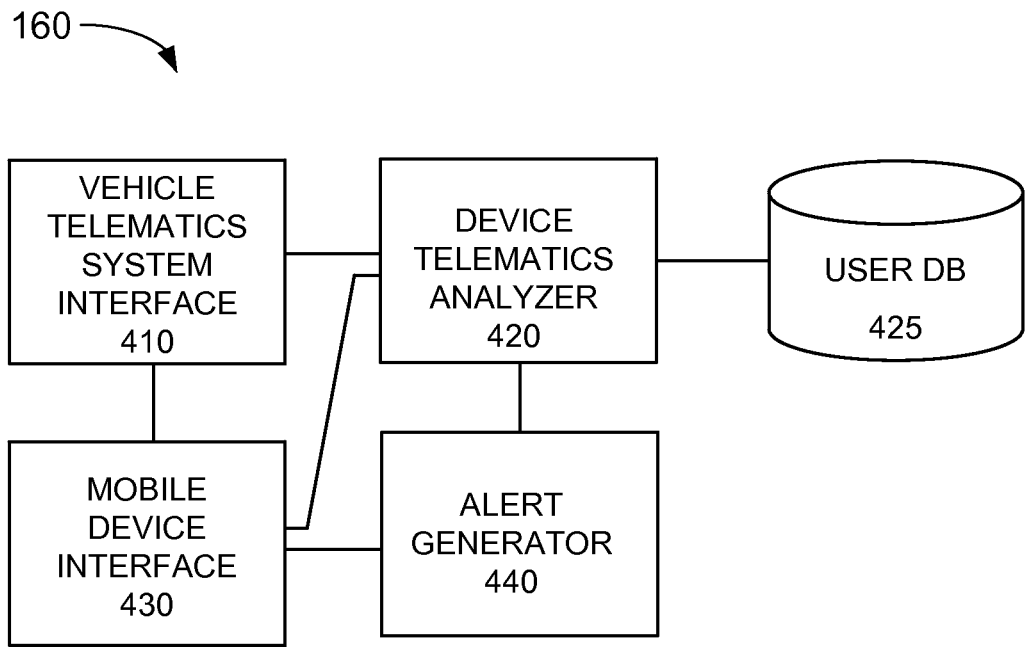
FIG. 4 is a diagram illustrating exemplary functional components of the device telematics system of FIG. 1.

FIG. 4 is a diagram illustrating exemplary functional components of device telematics system 160 according to a first implementation described herein. The functional components of device telematics system 160 may be implemented, for example, via processor 220 executing instructions from memory 230. Alternatively, some or all of the functional components of device telematics system 160 may be implemented via hard-wired circuitry. As shown in FIG. 4, device telematics system 160 may include a vehicle telematics system interface 410, a device telematics analyzer 420, a user database (DB) 425, a mobile device interface 430, and an alert generator 440.

Vehicle telematics system interface 410 may communicate with vehicle telematics system 150 to obtain vehicle telematics data received from vehicle device 115. Device telematics analyzer 420 may obtain vehicle telematics data relating to vehicle 110 from vehicle telematics system 150 and may obtain device telematics data from user device 120 via mobile device interface 430. Device telematics analyzer 420 may determine the distance between vehicle 110 and user device 120 and may determine whether the distance is greater than a distance threshold. If the distance is greater than a first distance threshold, an alert may be sent to the user's mobile communication device 130. If the distance is greater than a second distance threshold, greater than the first distance threshold, an alert may be sent to the user's supervisor (e.g., supervisor device 170).

User DB 425 may store information relating to particular users. Exemplary information that may be stored in user DB 425 is described below with reference to FIG. 6. Mobile device interface 430 may communicate with mobile communication devices, such as vehicle device 115, user device 120, mobile communication device 130, and/or supervisor device 170.

Alert generator 440 may send an alert to mobile communication device 130 if the distance between vehicle 110 and user device 120 is greater than a first distance threshold and/or may send an alert to supervisor device 170 if the distance between vehicle 110 and user device 120 is greater than a second distance threshold. Furthermore, alert generator 440 may send an alert to mobile communication device 130 and/or to supervisor device 170 if one or more of vehicle 110 and/or user device 120 are not reachable (i.e., are outside of a wireless coverage area of base station 145). In some implementations, alert generator 440 may send an SMS message, an MMS message, and/or an email message to mobile communication device 130 and/or supervisor device 170. In other implementations, alert generator 440 may send an alert to an alert application installed on mobile communication device 130.

Although FIG. 4 shows exemplary functional components of device telematics system 160, in other implementations, device telematics system 160 may include fewer functional components, different functional components, differently arranged functional components, or additional functional components than depicted in FIG. 4. Additionally or alternatively, one or more functional components of device telematics system 160 may perform functions described as being performed by one or more other functional components of device telematics system 160.

Figure 5:
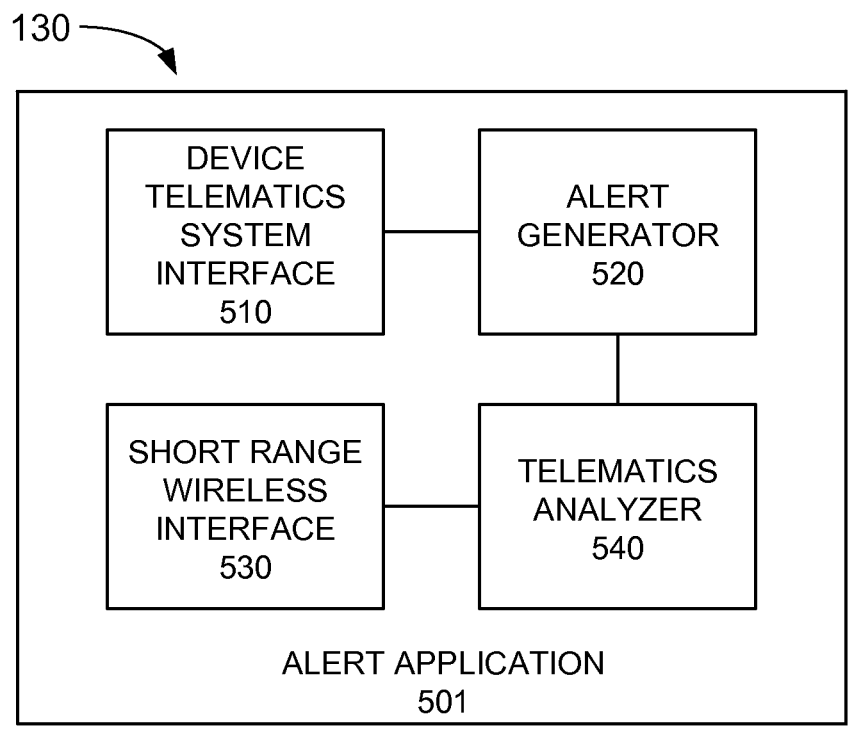
FIG. 5 is a diagram illustrating exemplary functional components of the mobile communication device of FIG. 1.

FIG. 5 is a diagram illustrating exemplary functional components of mobile communication device 130 according to a first implementation described herein. The functional components of mobile communication device 130 may be implemented, for example, via processing unit 310 executing instructions from memory 320. Alternatively, some or all of the functional components of mobile communication device 130 may be implemented via hard-wired circuitry. As shown in FIG. 5, mobile communication device 130 may include an alert application 501. Alert application 501 may be configured to generate an alarm in response to determining that user device 120 is not within a particular range while mobile communication device 130 is within range of vehicle 110. Alert application 501 may include a device telematics system interface 510, an alert generator 520, a short range wireless interface 530, and a telematics analyzer 540.

Device telematics system interface 510 may communicate with device telematics system 160. In some implementations, when alert application 501 is installed on mobile communication device 130, device telematics system 160 may send an alert to alert application 501 and alert application 501 may generate an alert in response. An alert generated by alert application 501 may be more effective than another type of message, such as an SMS message or an email message. For example, alert application 501 may override a silent setting and may generate a louder alert than an alert generated in response to receiving an SMS message.

Alert generator 520 may generate an alert, such as a display message, an audible message, and/or a vibration alert, in response to receiving an alert from device telematics system 160 and/or in response to receiving an instruction from telematics analyzer 540. Short range wireless interface 530 may be configured to establish a short range wireless connection with another device, such as vehicle device 115 and/or user device 120, using, for example, a Bluetooth connection.

Telematics analyzer 540 may determine whether one or both of vehicle 110 and user device 120 are within range. For example, telematics analyzer 540 may obtain a vehicle wireless identifier for vehicle 110 and a device wireless identifier for user device 120 and may determine whether either of the wireless identifier is detectable. If a wireless identifier is not detectable, telematics analyzer 540 may determine that the corresponding device is not in range. Furthermore, telematics analyzer 540 may determine a speed associated with mobile communication device 130 based on, for example, GPS receiver data and may determine whether mobile communication device 130 is moving faster than a particular threshold. Telematics analyzer 540 may instruct alert generator 520 to generate an alert if the device wireless identifier for user device 120 cannot be detected and the vehicle wireless identifier can be detected, and/or if the device wireless identifier for user device 120 cannot be detected and mobile communication device 130 is moving faster than a speed threshold (e.g., faster than 10 miles per hour).

Although FIG. 5 shows exemplary functional components of mobile communication device 130, in other implementations, mobile communication device 130 may include fewer functional components, different functional components, differently arranged functional components, or additional functional components than depicted in FIG. 5. Additionally or alternatively, one or more functional components of mobile communication device 130 may perform functions described as being performed by one or more other functional components of mobile communication device 130.

Figure 6:
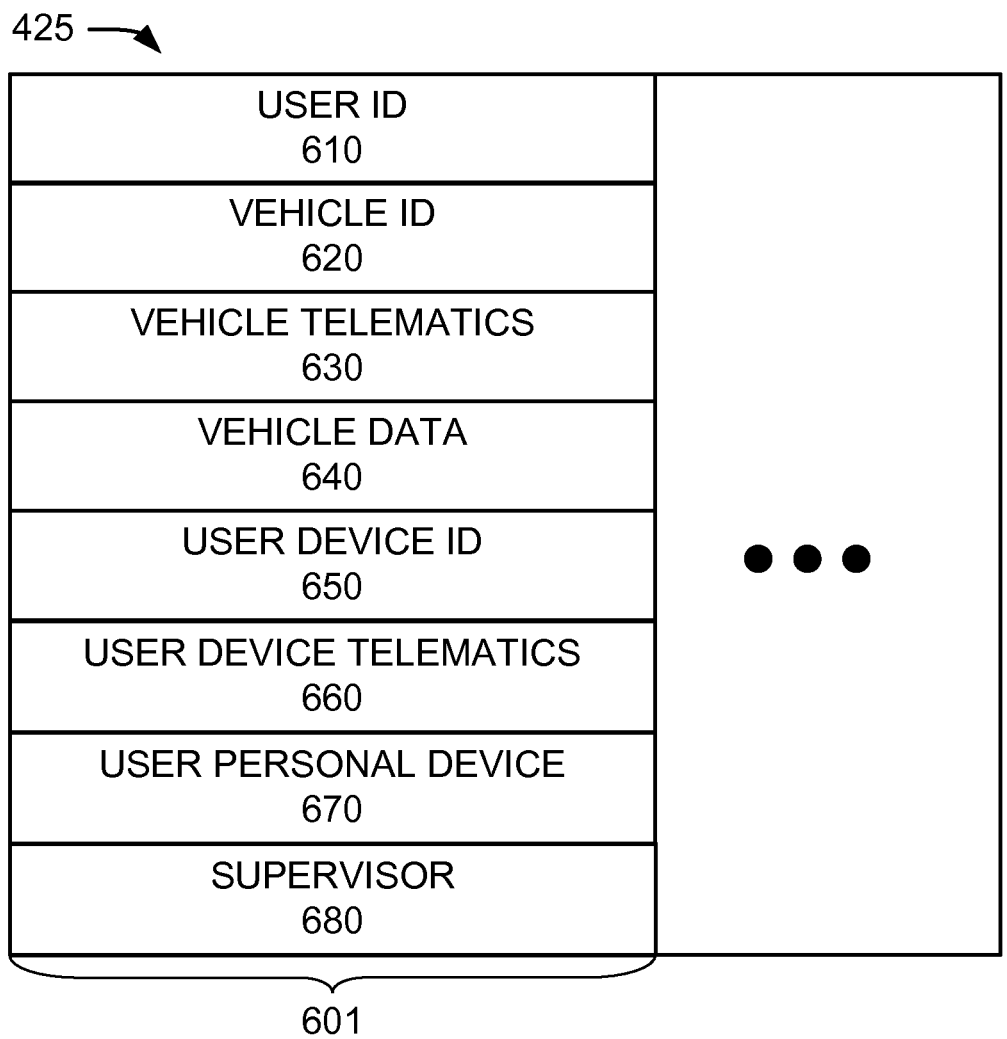
FIG. 6 is a diagram illustrating exemplary components that may be stored in the user database of FIG. 4.

FIG. 6 is a diagram illustrating exemplary components that may be stored in user DB 425 according to an implementation described herein. As shown in FIG. 6, user DB 425 can include one or more user records 601. Each user record 601 may store information relating to a particular user. User record 601 may include a user identification (ID) field 610, a vehicle ID field 620, a vehicle telematics field 630, a vehicle data field 640, a user device ID field 650, a user device telematics field 660, a user personal device field 670, and a supervisor field 680.

User ID field 610 may store one or more identifiers associated with the particular user. For example, user ID field 610 may include a name of the particular user, an employee number associated with the particular user, an account number associated with the particular user, and/or another type of identifier. Vehicle ID field 620 may store an identifier associated with a particular vehicle assigned to the particular user. For example, vehicle ID field 620 may include a VIN associated with the particular vehicle, a serial number associated with the particular vehicle, and/or another type of identifier.

Vehicle telematics field 630 may store vehicle telematics data received from vehicle device 115 during a particular time interval. For example, vehicle telematics field 630 may include one or more of the geographic coordinates of the particular vehicle (e.g., latitude and longitude), the accuracy of the geographic coordinates, a time stamp, a speed of the particular vehicle, a direction in which the particular vehicle is headed, the average speed of the particular vehicle during the particular time interval, and/or other types of telematics data. Vehicle data field 640 may store additional information associated with the particular vehicle, such as, for example, the schedule assigned to the vehicle, whether the vehicle is scheduled for maintenance, etc.

User device ID field 650 may store one or more identifiers associated with a particular user device 120 assigned to the particular user. For example, user device ID field 650 may include an MEID, an IMEI identifier, an equipment serial number, an IP address, a Media Access Control (MAC) address, and/or another type of device identifier.

User device telematics field 660 may store device telematics data received from user device 120 during the particular time interval. For example, user device telematics field 660 may include the geographic coordinates of the particular user device 120 (e.g., latitude and longitude), the accuracy of the geographic coordinates, a software version associated with the particular user device 120, a time stamp, time zone data, a wireless signal strength, a battery condition, a total available memory, a processor load, whether Global Positioning System (GPS) functionality is enabled, a list of installed applications, an operating system (OS) version, a total device uptime, a total traffic in bytes since uptime, whether user device 120 is enabled for Long Term Evolution (LTE) functionality, and/or other types of data associated with the particular user device 120.

User personal device field 670 may identify a personal device associated the particular user, such as mobile communication device 130, and/or may include contact information associated with the particular user. For example, user personal device field 670 may include a phone number associated with mobile communication device 130, an email address for the particular user, an IP address for mobile communication device 130 that may be used to communicate with alert application 501, and/or other types of contact information.

Supervisor field 680 may identify a supervisor associated with the user and may include contact information associated with the supervisor. For example supervisor field 680 may include a mobile telephone number and/or email address associated with supervisor device 170.

Although FIG. 6 shows exemplary components of user DB 425, in other implementations, user DB 425 may include fewer components, different components, differently arranged components, or additional components than depicted in FIG. 6.

Figure 7A:
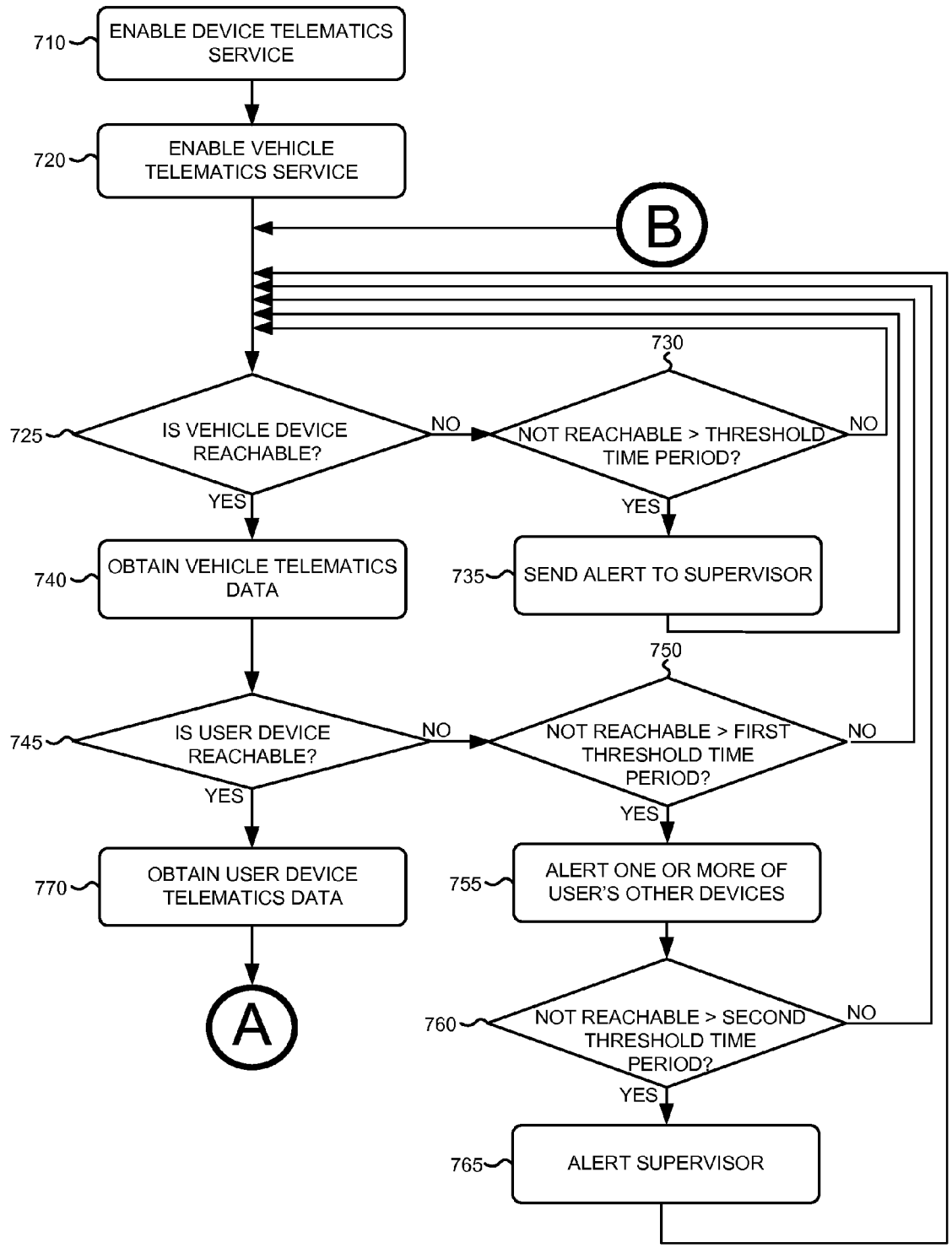
FIGS. 7A-7B are a flowchart for generating alerts based on device and vehicle telematics according to an implementation described herein.
Figure 7B:
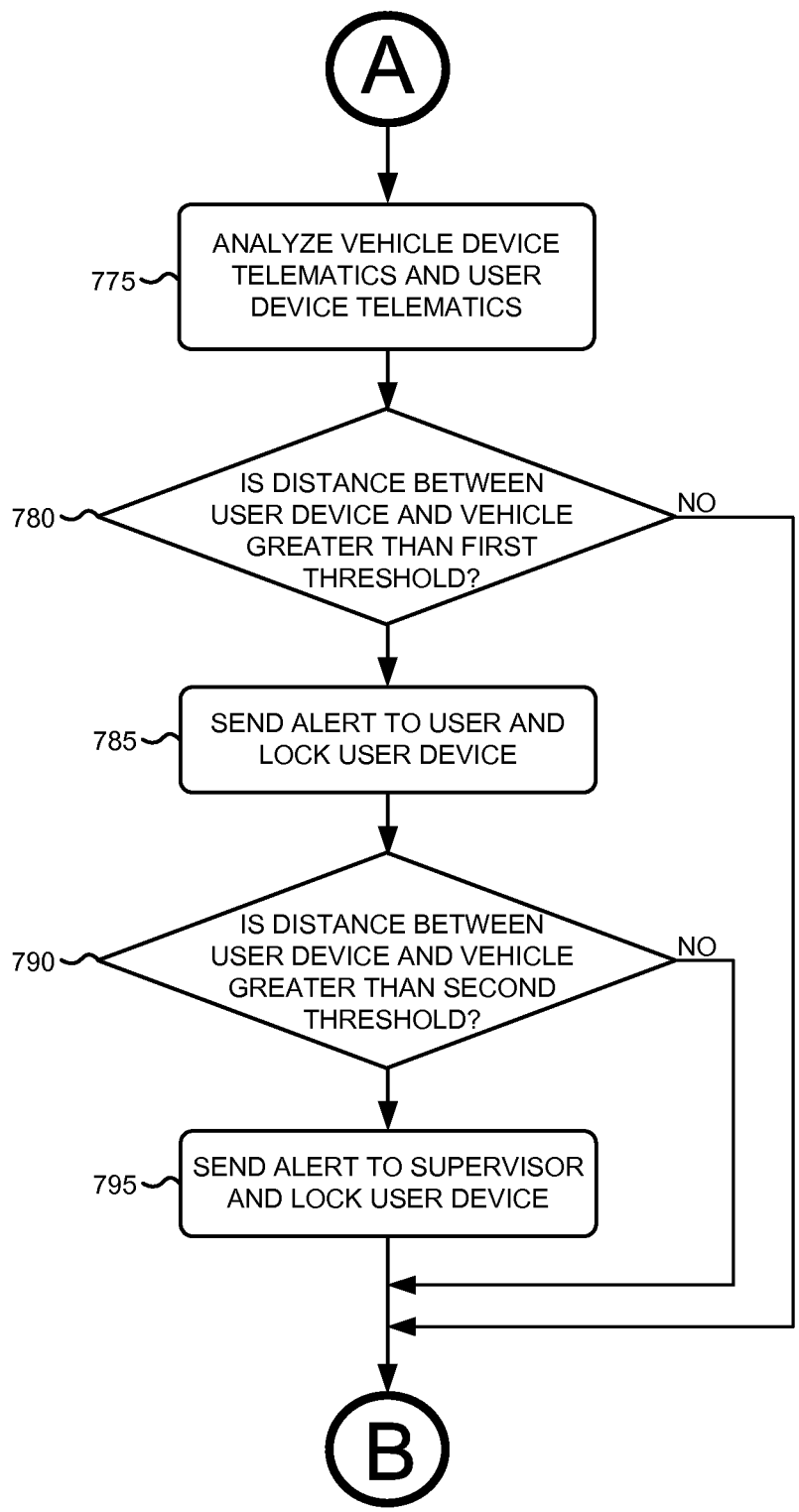

FIGS. 7A-7B are a flowchart for generating alerts based on device and vehicle telematics according to an implementation described herein. In some implementations, the process of FIGS. 7A-7B may be performed by device telematics system 160. In other implementations, some or all of the process of FIGS. 7A-7B may be performed by another device or a group of devices separate from and/or including device telematics system 160.

The process of FIG. 7A may include enabling device telematics (block 710) and enabling vehicle telematics (block 720). For example, device telematics system 160 may instruct user device 120 to send device telematics data to device telematics system 160 at particular intervals and may instruct vehicle telematics device 150 to provide vehicle telematics data to device telematics system 160 at particular intervals.

A determination may be made as to whether the vehicle device is reachable (block 725). For example, if vehicle telematics data has been received within a particular time period, then vehicle device 115 may be determined to be reachable and thus within the wireless coverage area.

If the vehicle device is not reachable (block 725—NO), a determination may be as to whether the vehicle device has not been reachable for longer than a threshold time period (block 730). If the vehicle device has been unreachable for longer than the threshold time period (block 730—YES), an alert may be sent to the supervisor (block 735). For example, alert generator 440 may access technician record 601 associated with the vehicle telematics data and may determine contact information associated with the supervisor of the user based on supervisor field 680. Alert generator 440 may send an SMS message to the supervisor's phone, may send an email to the supervisor's email account, and/or may generate another type of alert to inform the supervisor that the vehicle has been outside of the wireless coverage area for longer than the threshold time period. If the vehicle device has been unreachable for less than the threshold time period (block 730—NO), processing may return to block 725 to determine whether the vehicle device is reachable.

Returning to block 730, if the vehicle device is reachable (block 725—YES), vehicle telematics data may be obtained (block 740). For example, device telematics system 160 may obtain vehicle telematics data from vehicle telematics system 150. The obtained vehicle telematics data may include the location of vehicle 110. A determination may be made as to whether the user device is reachable (block 745).

If the user device is not reachable (block 745—NO), a determination may be as to whether the user device has not been reachable for longer than a first threshold time period (block 750). If the user device has been unreachable for less than the first threshold time period (block 750—NO), processing may return to block 725. If the user device has been unreachable for longer than the first threshold time period (block 750—YES), an alert may be sent to one or more of the user's other device (block 755). For example, alert generator 440 may access user record 601 associated with the vehicle telematics data and may determine contact information associated with the user based on user personal device field 670. Alert generator 440 may send an SMS message to mobile communication device 130, may send an email to the user's email account, which may be obtained by mobile communication device 130 during an email update operation, and/or may generate another type of alert to inform the user that the user device 120 has been left at a previous location. The alert may include the last obtained location for user device 120. Furthermore, device telematics system 160 may send an instruction to user device 120 to lock the user interface and to display contact information for the user (e.g., the phone number of mobile communication device 130). Locking the user interface prevents unauthorized use of user device 120 and/or prevents unauthorized access to data stored in user device 120.

A determination may be as to whether the user device has not been reachable for longer than a second threshold time period, longer than the first threshold time period (block 760). If the user device has been unreachable for less than the second threshold time period (block 760—NO), processing may return to block 725. If the user device has been unreachable for longer than the second threshold time period (block 760—YES), an alert may be sent to the supervisor (block 765). Alert generator 440 may send an SMS message to the supervisor's phone, may send an email to the supervisor's email account, and/or may generate another type of alert to inform the supervisor that user device 120 has been outside of the wireless coverage area for longer than the second threshold time period. Processing may return to block 725.

Returning to block 745, if the user device is reachable (block 745—YES), device telematics data may be obtained (block 770). For example, device telematics system 160 may obtain vehicle telematics data from user device 120. Processing may continue to block 775 in FIG. 7B.

Continuing with FIG. 7B, the obtained vehicle device telematics and the user device telematics may be analyzed (block 775). For example, device telematics analyzer 420 may retrieve location information for vehicle 110 from the obtained vehicle telematics data and may retrieve the location information from user device 120 from the obtained device telematics data. Device telematics analyzer 420 may then calculate the distance between vehicle 110 and user device 120 based on the determined location information.

A determination may be made as to whether the distance between the user device and the vehicle is greater than a first threshold distance (block 780). For example, device telematics analyzer 420 may determine whether the distance between vehicle 110 and user device 120 is greater than one mile. If the distance is less than the first threshold distance (block 780—NO), processing may return to block 725 and the distance calculation may be performed again with the next set of obtained telematics data.

If the distance is greater than the first threshold distance (block 780—YES), an alert may be sent to the user and the user device may be locked (block 785). For example, alert generator 440 may access user record 601 associated with the vehicle telematics data and may determine contact information associated with the user based on user personal device field 670. Alert generator 440 may send an SMS message to mobile communication device 130, may send an email to the user's email account, and/or may generate another type of alert to inform the user that the user device has been left at a previous location and that the user should return to the location to retrieve user device 120. The alert may include the last obtained location for user device 120. Furthermore, device telematics system 160 may send an instruction to user device 120 to lock the user interface and to display contact information for the user (e.g., the phone number of mobile communication device 130) on the display of user device 120.

A determination may be made as to whether the distance between the user device and the vehicle is greater than a second threshold distance (block 790). For example, device telematics analyzer 420 may determine whether the distance between vehicle 110 and user device 120 is greater than three miles. If the distance is less than the second threshold distance (block 790—NO), processing may return to block 725 and the distance calculation may be performed again with the next set of obtained telematics data. If the distance is greater than the second threshold distance (block 790—YES), an alert may be sent to the supervisor and the user device may be locked (block 795). Thus, the assumption may be that an alert has already been sent to the user and that the user has not responded to the alert, since the user continues to drive away from user device 120. Therefore, alert generator 440 may send an SMS message to the supervisor's phone, may send an email to the supervisor's email account, and/or may generate another type of alert to inform the supervisor that user device 120 has been left at a service location and may include information identifying the location of user device 120. The supervisor may dispatch another user, closest to the location, to retrieve user device 120.

Figure 8:
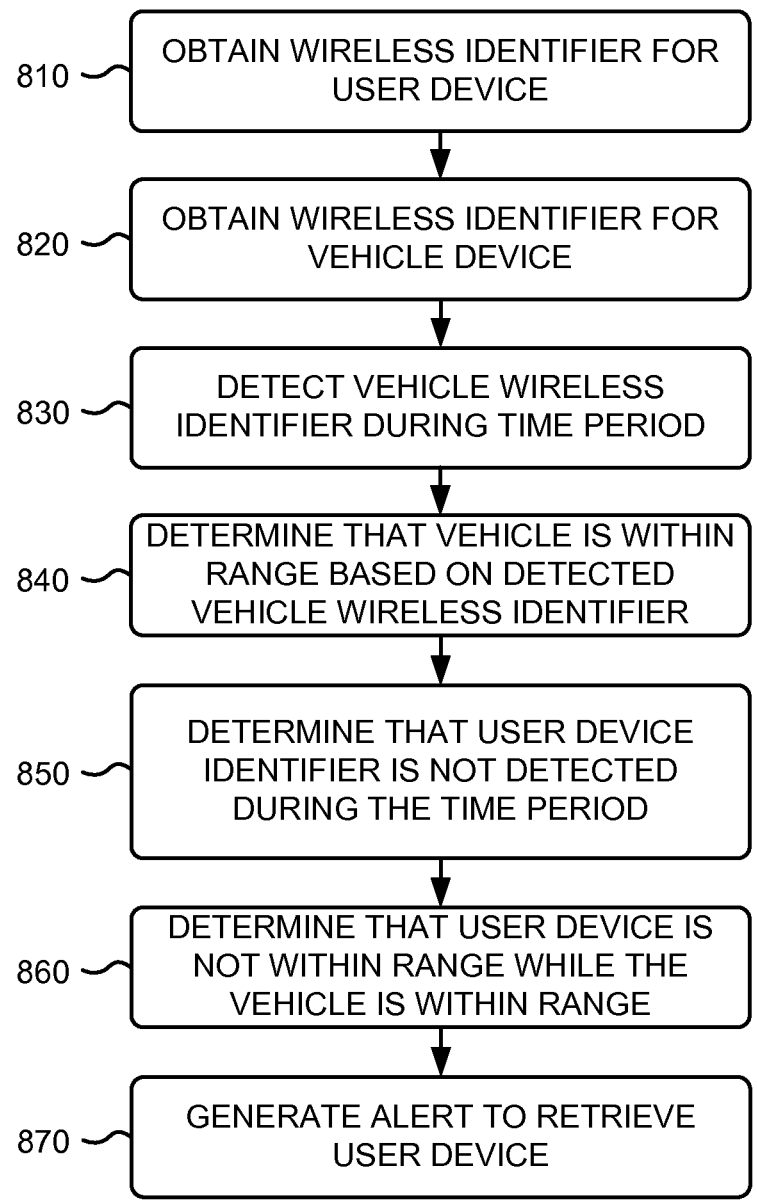
FIG. 8 is a flowchart of a first process for generating an alert by a mobile communication device according to an implementation described herein.

FIG. 8 is a flowchart of a first process for generating an alert by a mobile communication device according to an implementation described herein. In some implementations, the process of FIG. 8 may be performed by mobile communication device 130. In other implementations, some or all of the process of FIG. 8 may be performed by another device or a group of devices separate from and/or including mobile communication device 130.

The process of FIG. 8 may include obtaining a wireless identifier for a user device (block 810) and obtaining a wireless identifier for a vehicle device (block 820). For example, alert application 501 may obtain a list of wireless identifiers, such as Bluetooth identifiers, of nearby devices when user device 120 is within transmission range (e.g., within 30 feet for a Bluetooth protocol) of mobile communication device 130 and may prompt the user to confirm the wireless identifier for user device 120. Additionally or alternatively, user device 120 may be instructed to transmit the wireless identifier to alert application 501. Similarly, when vehicle device 115 is within transmission range, the wireless identifier for vehicle device 115 may be obtained by alert application 501.

The vehicle wireless identifier may be detected during a time period (block 830) and a determination may be made that the vehicle is within range based on the detected vehicle wireless identifier (block 840). For example, alert application 501 may determine that mobile communication device 130 is within transmission range of a short range wireless transmission protocol based on being able to detect the vehicle wireless identifier.

A determination may be made that the user device identifier is not detected during the time period (block 850) and a determination may be made that the user device is not within range while the vehicle is within range (block 860). For example, alert application 501 may determine that the device wireless identifier for user device 120 cannot be detected for at least a particular length of time while the vehicle wireless identifier is within range. Thus, the user may be within vehicle 110 for the particular length of time without user device 120 being in the vicinity of vehicle 110.

In response, an alert may be generated to retrieve the user device (block 870). For example, alert application 501 may display a message on mobile communication device 130, may generate an audible message, and/or may activate a vibration alarm to inform the user that user device 120 is not detected and that the user may need to return and retrieve user device 120 from the last service location.

Figure 9:
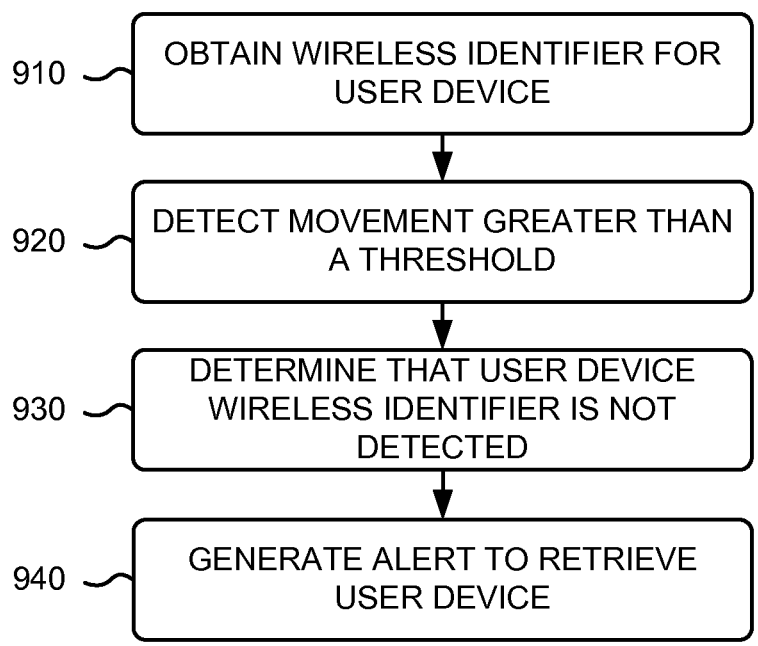
FIG. 9 is a flowchart of a second process for generating an alert by a mobile communication device according to an implementation described herein.

FIG. 9 is a flowchart of a second process for generating an alert by a mobile communication device according to an implementation described herein. In some implementations, the process of FIG. 9 may be performed by mobile communication device 130. In other implementations, some or all of the process of FIG. 9 may be performed by another device or a group of devices separate from and/or including mobile communication device 130.

The process of FIG. 9 may include obtaining a wireless identifier for a user device (block 910). For example, alert application 501 may obtain a list of wireless identifiers, such as Bluetooth identifiers, of nearby devices when user device 120 is within transmission range (e.g., within 30 feet for a Bluetooth protocol) of mobile communication device 130 and may prompt the user to confirm the wireless identifier for user device 120. Additionally or alternatively, user device 120 may be instructed to transmit the wireless identifier to alert application 501.

Movement greater than a threshold may be detected (block 920). For example, alert application 501 may detect that mobile communication device 130 is moving faster than a threshold speed (e.g., 10 miles per hour), which may indicate that the user is driving. In response, alert application 501 may attempt to detect the device wireless identifier for user device 120.

A determination may be made that the user device wireless identifier is not detected (block 930) while mobile communication device 130 is moving faster than the threshold and, in response, an alert may be generated to retrieve the user device (block 940). Thus, the user may be driving without user device 120 being in the vicinity of vehicle 110. Therefore, alert application 501 may display a message on mobile communication device 130, may generate an audible message, and/or may activate a vibration alarm to inform the user that user device 120 is not detected and that the user may need to return and retrieve user device 120 from the last service location.

Figure 10:
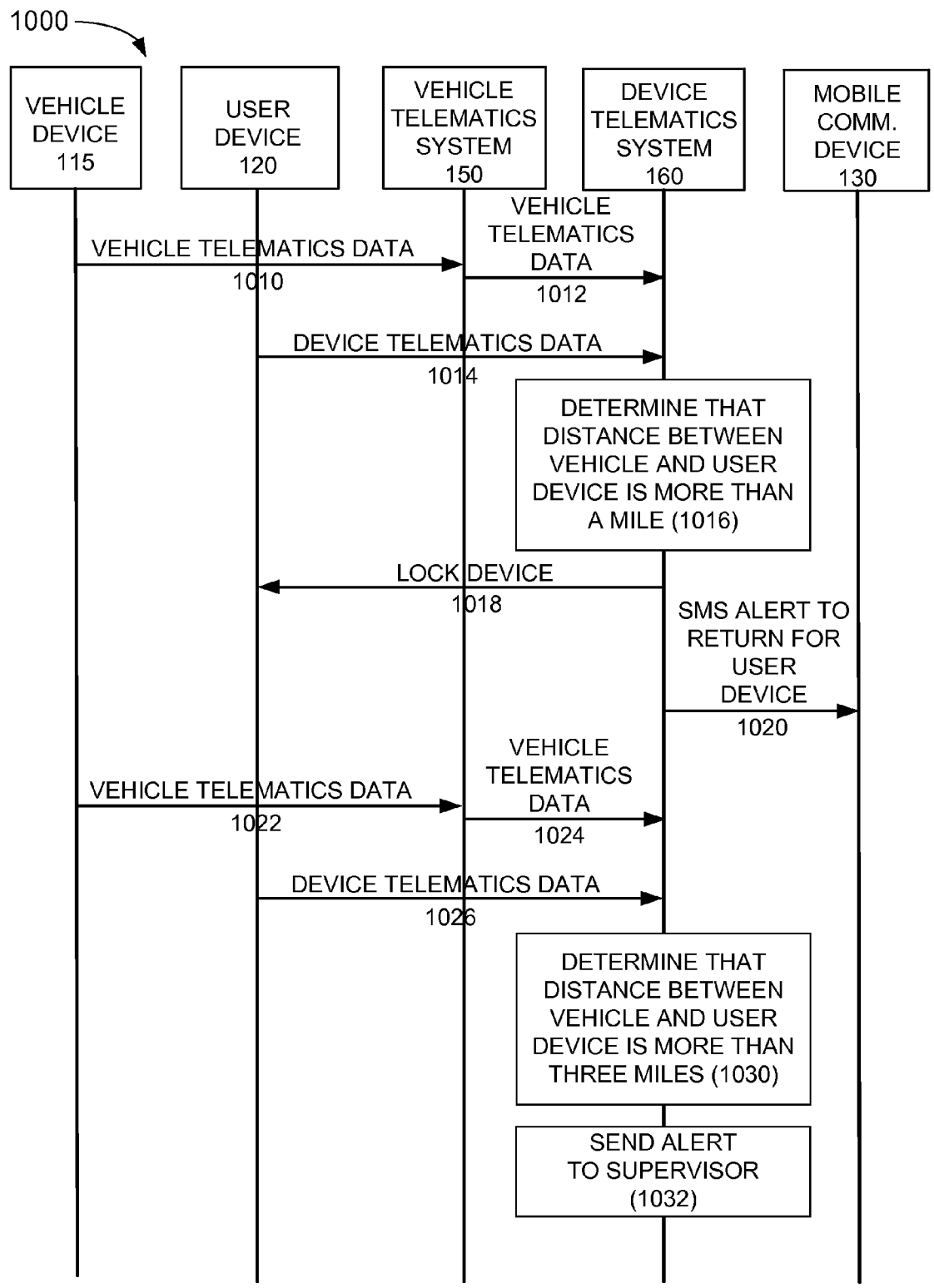
FIG. 10 is a diagram of a first exemplary signal flow scenario according to an implementation described herein.

FIG. 10 is a diagram of a first exemplary signal flow scenario 1000 according to an implementation described herein. Assume a user has accidentally left user device 120 at a customer's location and starts driving away in vehicle 110. Vehicle telematics system 150 collects, at particular intervals, vehicle telematics data from vehicle device 115 and device telematics system 160 collects, at particular intervals, device telematics data from user device 120. Assume that after the user has driven more than one mile away from the location where user device 120 has been left, vehicle device 115 sends vehicle telematics data to vehicle telematics system 150 (signal 1010) and vehicle telematics system 150 sends the vehicle telematics data to device telematics system 160 (signal 1012). Furthermore, within a same time interval, user device 120 sends device telematics data to device telematics system 160 (signal 1014).

Device telematics system 160 may retrieve the location of vehicle 110 from the vehicle telematics data and may retrieve the location of user device 120 from the device telematics data, may calculate the distance between vehicle 110 and user device 120, and may determine that the distance between vehicle 110 and user device 120 is greater than a mile (block 1016). In response, device telematics system 160 may send an instruction to user device 120 to lock user device 120 and to display a message to call the phone number of mobile communication device 130 (signal 1018). The displayed message may state, for example "Verizon Property. Please call XXX-XXX-XXXX," with the individual X's corresponding to the digits of the phone number. Furthermore, device telematics system 160 may send an SMS message alert to mobile communication device 130 (signal 1020). The SMS message may state, for example, "Service Tablet left at 123 Meadow Street. Please return to retrieve Service Tablet."

Assume further that the user does not return for user device 120. For example, the user may not notice the SMS message and may continue to drive away from the location at which user device 120 was left. At a later time, vehicle device 115 sends another set of vehicle telematics data to vehicle telematics system 150 (signal 1022) and vehicle telematics system 150 sends the vehicle telematics data to device telematics system 160 (signal 1024), and user device 120 sends device telematics data to device telematics system 160 (signal 1026). Device telematics system 160 may retrieve the location of vehicle 110 from the vehicle telematics data and may retrieve the location of user device 120 from the device telematics data, may calculate the distance between vehicle 110 and user device 120, and may determine that the distance between vehicle 110 and user device 120 is greater than three miles (block 1030). In response, device telematics system 160 may send an alert to the supervisor (block 1032). For example, device telematics system 160 may send an SMS message to supervisor device 170 (not shown in FIG. 10), informing the supervisor of the user that user device 120 has been left at the location. In response, the supervisor may select another user, who is closest to the location, to go pick up user device 120.

Figure 11:
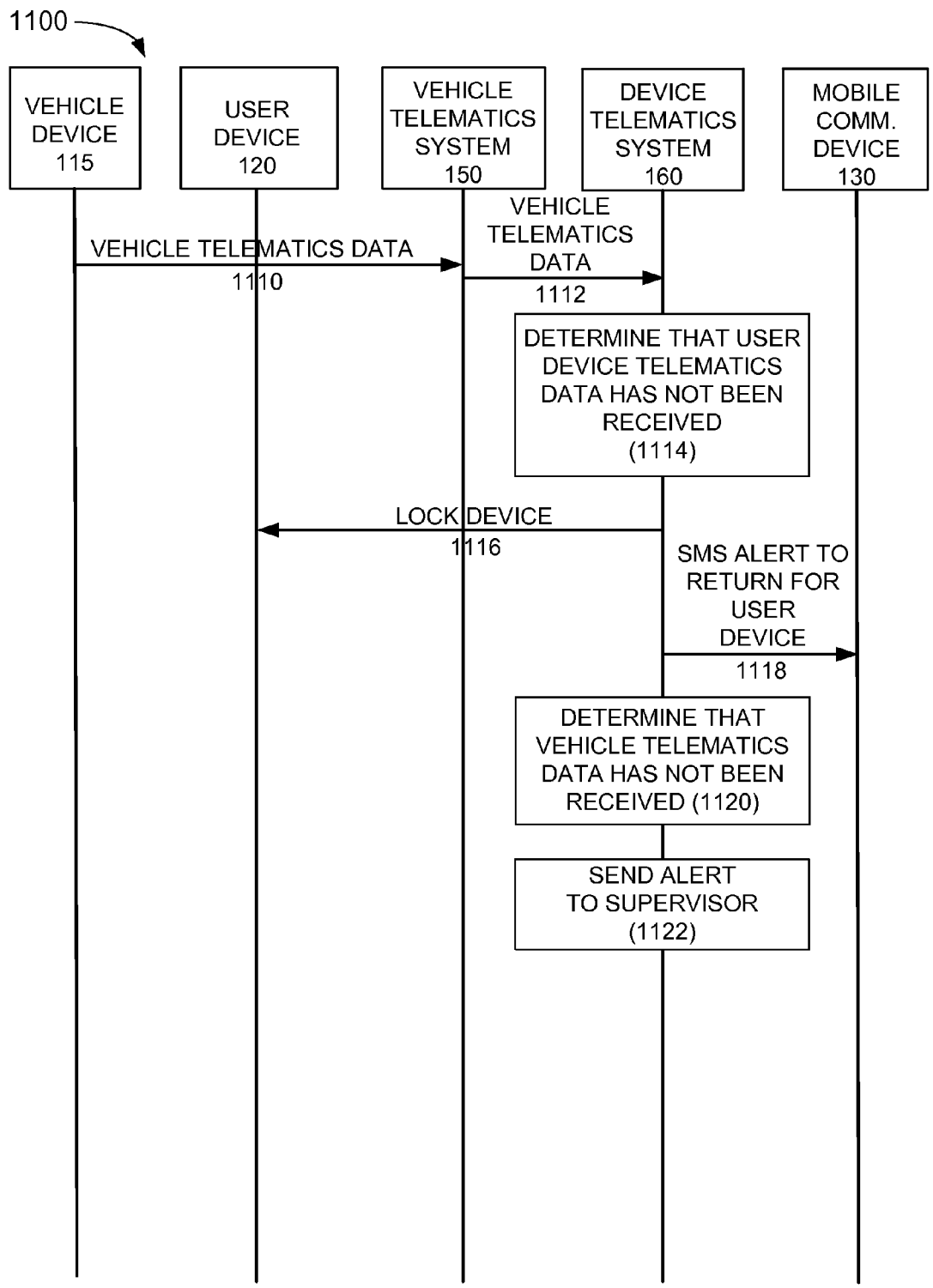
FIG. 11 is a diagram of a second exemplary signal flow scenario according to an implementation described herein.

FIG. 11 is a diagram of a second exemplary signal flow scenario 1100 according to an implementation described herein. In scenario 1100, vehicle 110 and user device 120 are outside of wireless coverage. Assume that vehicle device 115 sends vehicle telematics data to vehicle telematics system 150 (signal 1110) and vehicle telematics system 150 sends the vehicle telematics data to device telematics system 160 (signal 1112). Furthermore, assume that device telematics system 160 determines that no device telematics data has been received from user device 120 for over 15 minutes (block 1114). In response, device telematics system 160 may determine that user device 120 is out of the wireless coverage area and may send an instruction to user device 120 to lock user device 120 (signal 1116). Furthermore, device telematics system 160 may send an SMS message alert to mobile communication device 130 (signal 1118) to alert the user that user device 120 may have been left at the last location. The SMS message may include the last known location for user device 120.

At a later time, device telematics system 160 may determine that no vehicle telematics data has been received from vehicle telematics system 150, or may receive an indication from vehicle telematics system 150 that no vehicle telematics data has been received, for over 60 minutes (block 1120). Furthermore, device telematics system 160 may determine that vehicle 110 has been assigned to a user and that the current time is within the user's shift hours. In response, device telematics system 160 may send an alert to the supervisor (block 1122). For example, device telematics system 160 may send an SMS message to supervisor device 170 (not shown in FIG. 11), informing the supervisor that the vehicle is outside of wireless coverage.

Figure 12:
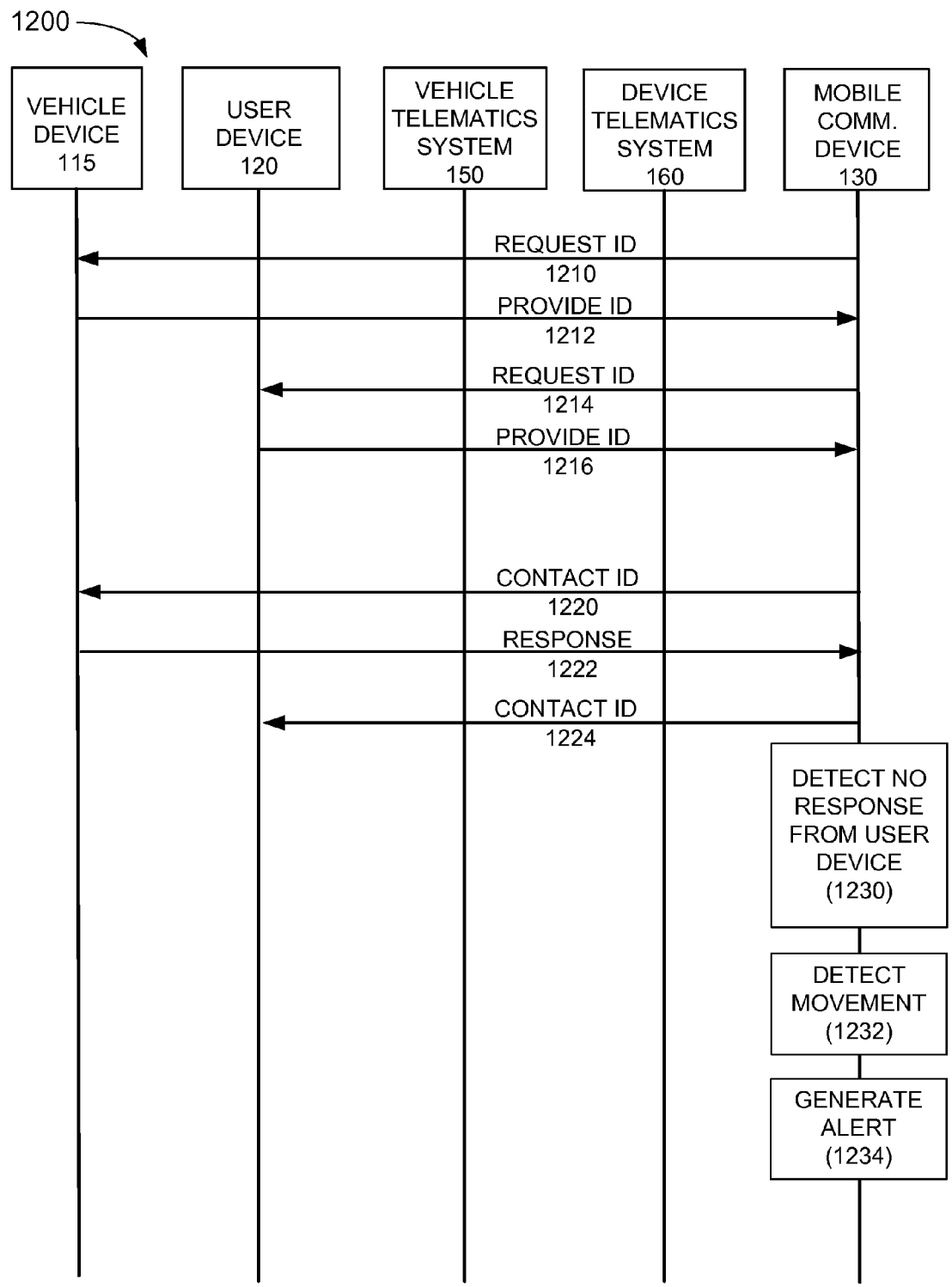
FIG. 12 is a diagram of a third exemplary signal flow scenario according to an implementation described herein.

FIG. 12 is a diagram of a third exemplary signal flow scenario 1200 according to an implementation described herein. In scenario 1200, alert application 501 has been installed on mobile communication device 130. Alert application 501 may obtain a wireless identifier from vehicle device 115 via, for example, a Bluetooth connection (signal 1210) and may obtain the vehicle wireless identifier (signal 1212). Furthermore, alert application 501 may obtain a vehicle wireless identifier from user device 120 via a Bluetooth connection (signal 1214) and may obtain the device wireless identifier (signal 1216). At particular intervals, alert application 501 may attempt to detect the vehicle wireless identifier and the device wireless identifier in order to determine whether vehicle 115 and user device 120 are within transmission range.

Assume a user has accidentally left user device 120 at a customer's location and starts driving away in vehicle 110. Alert application 501 may detect the vehicle wireless identifier (signals 1220 and 1222), but may not detect the device wireless identifier (signal 1224 and block 1230), since user device 120 may be out of the short-range wireless transmission range. Furthermore, alert application 501 may detect that mobile communication device 130, located inside vehicle 110, is moving faster than a speed threshold, indicating a driving speed (e.g., faster than 10 miles per hour) (block 1232). Alert application 501 may use the speed information to confirm that the user is driving and that user device 120 is not located in vehicle 110. In response, alert application 501 may display an alert and/or may generate an audible alert to inform the user that user device 120 has been left at the last service location (block 1234).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7A-7B, 8, and 9, and series of signal flows have been described with respect to FIGS. 10-12, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   obtaining, by the computer device, vehicle telematics data relating to a vehicle operated by a user, wherein the vehicle telematics data is received via a base station and includes information identifying a location of the vehicle;
   obtaining, by the computer device, device telematics data relating to a user device associated with the user, wherein the device telematics data is received via a base station and includes information identifying a location of the user device;
   calculating, by the computer device, a distance between the user device and the vehicle based on the information identifying the location of the vehicle and the information identifying the location of the user device;
   determining, by the computer device, that the calculated distance between the user device and the vehicle is greater than a specified first distance threshold; and
   sending, by the computer device, an alert to a mobile communication device associated with the user, in response to determining that the calculated distance between the user device and the vehicle is greater than the specified first distance threshold.

2. The method of claim 1, wherein the alert includes the information identifying the location of the user device.

3. The method of claim 1, wherein the alert is sent via at least one of a Short Message Service message, a Multimedia Message Service message, or an email message.

4. The method of claim 1, further comprising:
   sending an instruction to the user device to lock the user device based on determining that the calculated distance between the user device and the vehicle is greater than a specified first distance threshold.

5. The method of claim 1, further comprising:
   determining that the distance between the user device and the vehicle is greater than a specified second distance threshold, wherein the specified second distance threshold is greater than the specified first distance threshold; and
   sending an alert to a supervisor of the user, in response to determining that the distance between the user device and the vehicle is greater than the specified second distance threshold.

6. The method of claim 1, further comprising:
   determining that the vehicle is not reachable for a duration of a first time period; and
   sending an alert to a supervisor of the user, in response to determining that the vehicle is not reachable for the duration of the first time period.

7. The method of claim 1, further comprising:
   determining that the user device is not reachable for a duration of a first time period; and
   sending an alert to the mobile communication device associated with the user, in response to determining that the user device is not reachable for the duration of the first time period.

8. The method of claim 7, further comprising:
   determining that the user device is not reachable for a duration of a second time period, wherein the second time period is longer than the first time period; and
   sending an alert to a supervisor of the user, in response to determining that the user device is not reachable for the duration of the second time period.

9. The method of claim 1, further comprising:
   sending an instruction to the user device to display a message to call the mobile communication device.

10. A computer device comprising:
    logic configured to:
       obtain vehicle telematics data relating to a vehicle operated by a user, wherein the vehicle telematics data is received via a base station and includes information identifying a location of the vehicle;
       obtain device telematics data relating to a user device associated with the user, wherein the device telematics data is received via a base station and includes information identifying a location of the user device;
       calculate a distance between the user device and the vehicle based on the information identifying the location of the vehicle and the information identifying the location of the user device;
       determine that the calculated distance between the user device and the vehicle is greater than a specified first distance threshold; and
       send an alert to a mobile communication device associated with the user, in response to determining that the calculated distance between the user device and the vehicle is greater than the specified first distance threshold.

11. The computer device of claim 10, wherein the alert includes the information identifying the location of the user device.

12. The computer device of claim 10, wherein the alert is sent via at least one of a Short Message Service message, a Multimedia Message Service message, or an email message.

13. The computer device of claim 10, wherein the logic is further configured to:
    send an instruction to the user device to lock the user device based on determining that the calculated distance between the user device and the vehicle is greater than a specified first distance threshold.

14. The computer device of claim 10, wherein the logic is further configured to:
    determine that the distance between the user device and the vehicle is greater than a specified second distance threshold, wherein the specified second distance threshold is greater than the specified first distance threshold; and
    send an alert to a supervisor of the user, in response to determining that the distance between the user device and the vehicle is greater than the specified second distance threshold.

15. The computer device of claim 10, wherein the logic is further configured to:
    determine that the vehicle is not reachable for a duration of a first time period; and
    send an alert to a supervisor of the user, in response to determining that the vehicle is not reachable for the duration of the first time period.

16. The computer device of claim 10, wherein the logic is further configured to:
- determine that the user device is not reachable for a duration of a first time period; and
- send an alert to a mobile communication device associated with the user, in response to determining that the user device is not reachable for the duration of the first time period.

17. The computer device of claim 16, wherein the logic is further configured to:
- determine that the user device is not reachable for a duration of a second time period, wherein the second time period is longer than the first time period; and
- send an alert to a supervisor of the user, in response to determining that the user device is not reachable for the duration of the second time period.

18. The computer device of claim 10, wherein the logic is further configured to:
- send an instruction to the user device to display a message to call the mobile communication device.

19. A method performed by a mobile communication device, the method comprising:
- obtaining, by the mobile communication device, a first wireless identifier associated with a vehicle operated by a user;
- obtaining, by the mobile communication device, a second wireless identifier associated with a user device operated by the user;
- detecting, by the mobile communication device, the first wireless identifier during a time period;
- determining, by the mobile communication device, that the vehicle is within a range during the time period based on detecting the first wireless identifier;
- determining, by the mobile communication device, that the second wireless identifier is not detected during the time period;
- determining, by the mobile communication device, that the user device is not within range during the time period based on determining that the second wireless identifier is not detected; and
- generating, by the mobile communication device, an alert informing a user to retrieve the user device, in response to determining that the user device is not within range during the time period.

20. The method of claim 19, further comprising:

determining that the mobile communication device is moving faster than a speed threshold during the time period; and wherein generating the alert informing the user to retrieve the user device is further based on determining that the mobile communication device is moving faster than the speed threshold.

* * * * *